United States Patent

[11] 3,617,775

[72] Inventor James D. Allen
Pinellas, Fla.
[21] Appl. No. 42,948
[22] Filed June 3, 1970
[45] Patented Nov. 2, 1971

[54] CIRCUIT FOR CHARGING THE DISTRIBUTED CAPACITANCE OF A PLATED WIRE MEMORY
5 Claims, 1 Drawing Fig.

[52] U.S. Cl. .......... 307/270, 307/241, 307/282, 340/174 DC, 340/174 TB, 340/174 PW, 307/238
[51] Int. Cl. .......... H03k 3/21, H03k 3/51
[50] Field of Search .......... 307/270, 238, 246, 282, 88; 340/174 DC, 174 TB, 174 PW

[56] References Cited

UNITED STATES PATENTS

| | | | |
|---|---|---|---|
| 3,025,411 | 3/1962 | Rumble .......... | 340/174 TB |
| 2,993,198 | 7/1961 | Barnes et al. .......... | 340/174 DC |
| 3,479,521 | 11/1969 | Snare .......... | 307/270 X |
| 3,523,197 | 8/1970 | Salzer .......... | 307/270 |
| 3,546,484 | 12/1970 | Fowler et al. .......... | 307/270 X |

*Primary Examiner*—John S. Heyman
*Attorneys*—Charles J. Ungemach, Ronald T. Reiling and James A. Phillips

ABSTRACT: A circuit used in a plated wire memory stack for rapidly charging the distributed capacitance associated with inductive word straps in the stack. Charging follows read or write cycles and effectively reverse-biases diodes in series with the previously selected straps in preparation for a new cycle, thus preventing the inductive kick of a newly selected strap from energizing nonselected straps.

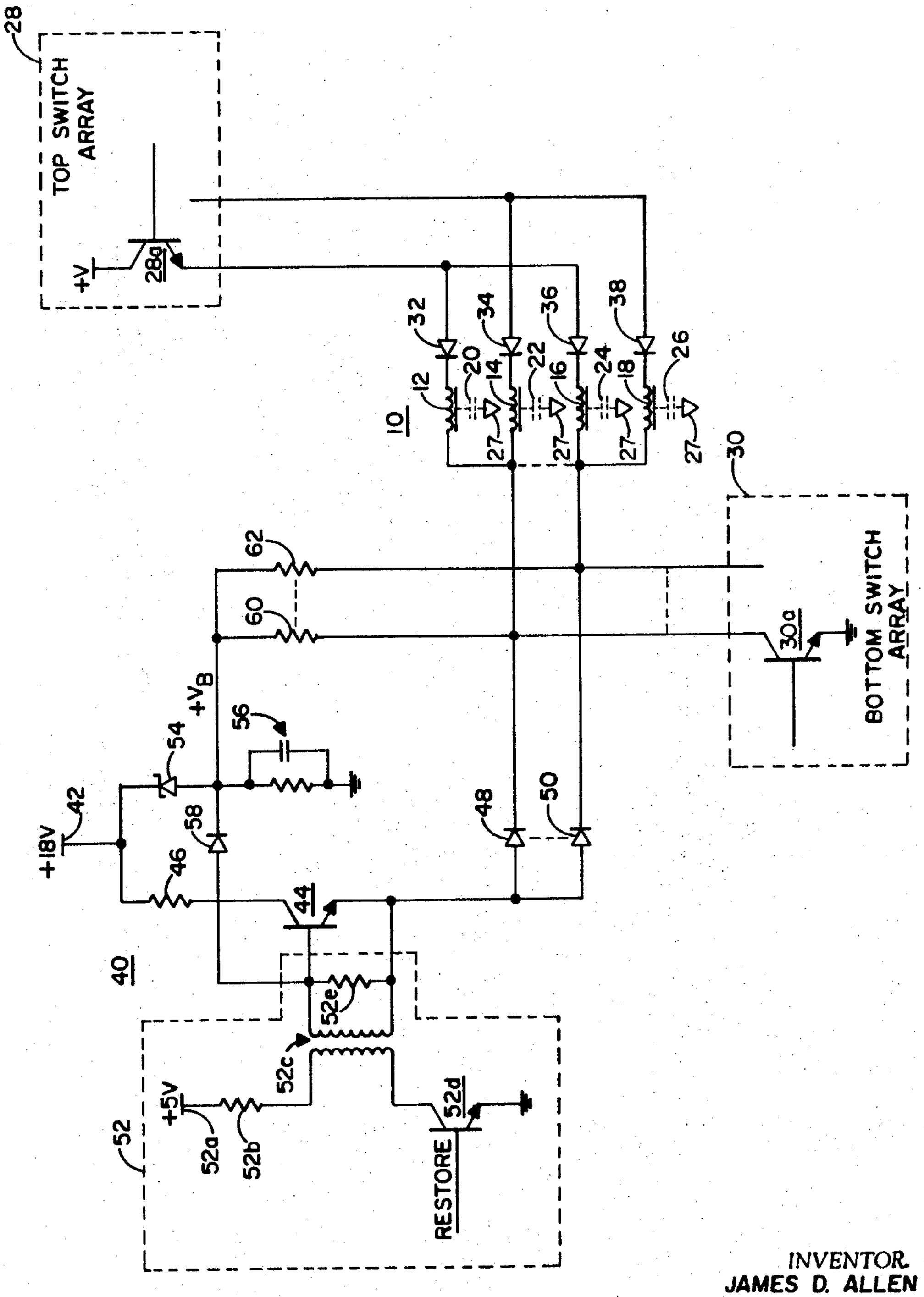
INVENTOR.
JAMES D. ALLEN
BY
ATTORNEY

CIRCUIT FOR CHARGING THE DISTRIBUTED CAPACITANCE OF A PLATED WIRE MEMORY

BACKGROUND OF THE INVENTION

The invention pertains to plated wire memory stacks and more specifically concerns a circuit for rapidly charging the distributed capacitance associated with the word straps in a plated wire memory stack.

In a prior circuit a zener reference diode is connected in series with the main charging current and consequently has to handle a relatively large amount of power. Furthermore with the zener reference diode in series, the distributed capacitance charges exponentially toward a voltage, called the bias or clamp voltage, which is less than the supply voltage by an amount equal to the drop across the zener diode. Since the potential level to which the stack capacitance has to be charged for proper operation is about the same as the available potential level towards which the capacitance is charged, the charge time (which is directly related to memory cycle time) is relatively long. The prior circuit also requires external critical timing signals for the turn on and turn off the high-current switch. The present circuit greatly reduces the memory cycle time by more rapidly charging the stack capacitance to the bias voltage. The circuit does this by providing a current drive of higher voltage for the charging of the capacitance. The circuit also monitors the voltage across the capacitance and provides an internal clamp to switch off the relatively high-current drive when the bias voltage is reached. The present circuit also has fewer components than the prior circuit.

SUMMARY

A plated wire memory includes word straps. The straps are inductive and each strap has some distributed capacitance associated with it. Since the straps are inductive a large (electromotive force) is induced when a rapidly changing current is applied to a selected strap during a read or write cycle. This large e.m.f. tends to energize nonselected straps. This invention provides an improved circuit for charging the distributed capacitance of each strap preceding write or read cycles, thus directly reducing the delay required before a new cycle can be initiated. A charge on the distributed capacitance reverse biases selection diodes associated with each strap and thereby prevents the induced e.m.f. from energizing nonselected straps.

The improved circuit includes an electrical energy source at a first potential and a switching means connected between the source and the distributed capacitance of each strap. The switching means is turned on by an external signal (called a restore signal) and the capacitances start charging toward the first potential. Charging continues until a second potential, lower than the first, is reached at which time the switch is turned off internally by shunting the external signal. The charge on the distributed capacitances is clamped at the second potential.

DESCRIPTION OF THE DRAWING

The single drawing is a schematic diagram of the charging circuit shown connected to a plated wire memory.

DESCRIPTION OF THE PREFERRED EMBODIMENT

A plated wire memory stack 10 includes plated wires (not shown) and inductive word straps 12, 14, 16 and 18. Associated with word straps 12, 14, 16 and 18 are distributed capacitances 20, 22, 24, and 26 respectively. The distributed capacitances are drawn with dashed lines and are shown as being between the straps and a reference point 27. Reference point 27 is called the plated wire reference and is not the same as the ground reference occurring in other parts of the circuit. The major portion of the distributed capacitance is from the word straps to the plated wires which are floating but which are very low impedance. Therefore the plated wire reference point 27 is a floating reference. Note that only a small portion of the memory stack is shown, enough to describe the invention. Current is applied to selected straps by energizing transistor switches in switching arrays 28 and 30. Switching array 28 is called the top switch array and switching array 30 is called the bottom switch array. Connected in series with straps 12, 14, 16 and 18 are selection diodes 32, 34, 36 and 38 respectively. By turning on a particular transistor switch in array 28 and a particular transistor switch in array 30, current can be applied to a single selected word strap. For example when a transistor switch **28*a* in array 28 and a transistor switch 30*a* in array 30 are turned on, current is applied through selection diode 32 to strap 12. The sudden application of current to strap 12 causes a large voltage to be induced in strap 12 such that the right end of strap 12 becomes highly positive. If the cathode of diode 36 were not at the bias potential, $V_B$, then this positive induced voltage in strap 12 would forward bias selection diode 36 and cause a current to flow in strap 16 through the distributed capacitance 24. This is very undesirable and a circuit 40 is used to reverse-bias all of the selection diodes, including diode 36, by charging up the distributed capacitances. For example, the distributed capacitance 24 is charged such that the upper end thereof is positive. This reverse-biases diode 36 and prevents the voltage induced in strap 12 from being transmitted through diode 36 and disturbing strap 16**.

Circuit 40 is an improved circuit for reverse-biasing the selection diodes in stack 10 by charging the distributed capacitances in stack 10 more rapidly. Circuit 40 includes a source of electrical energy 42 at a potential of +18 volts, for example and a switching means 44 which may be a junction transistor of the NPN type, for example. The collector of transistor 44 is connected to the voltage source 42 by means of a resistor 46 and the emitter is connected to the straps in memory stack 10 by diodes 48 and 50. Diode 48 connects the emitter to the left end of straps 12 and 14 and diode 50 connects the emitter to the left end of straps 16 and 18. Thus when transistor 44 is turned on, current flows from the source 42 through resistor 46, transistor 44, and diodes 48 and 50 to all of the distributed capacitances in stack 10. A circuit 52 provides means for applying a turn on signal to transistor 44. Circuit means 52 includes a series circuit comprising a source of electrical energy **52*a* at a potential of +5 volts, for example, a resistor 52*b* the primary winding of a transformer 52*c*, and the collector-emitter circuit of an NPN junction transistor 52*d*. When a signal of positive potential (restore signal) is supplied to the base of transistor 52*d* a current flows in the series circuit and a voltage is induced in the secondary winding of transformer 52*c*. This causes a current to flow in the secondary winding and a voltage is developed across a resistor 52*e* connected across the secondary winding of transformer 52*c*. Resistor 52*e* is connected across the base-emitter electrodes of transistor 44. Thus when a positive signal is supplied to the base of transistor 52*d* a positive signal occurs at the base of transistor 44, turning it on. In this way large currents are made available to the distributed capacitances in memory stack 10** and they charge rapidly towards +18 volts.

Also connected to source 42 is a biasing means comprising a zener diode 54 connected in series with a filter network 56 comprises a resistor and capacitor in parallel. The potential at the junction of diode 54 and network 56 is $+V_B$, the bias voltage. The voltage $+V_B$ is less than the +18 volts of source 42 by the amount dropped across zener diode 54.

A diode 58 is connected between the base of transistor 44 and the junction of diode 54 and network 56. When the potential of the distributed capacitances in stack 10 reaches a level which is about equal to $+V_B$ the signal to the base of transistor 44, turning it on, is shunted by diode 58 to the junction between zener diode 54 and network 56. This causes transistor 44 to operate in its linear range, substantially reduces its current level, and clamps it emitter voltage at approximately $+V_B$ volts.

Two resistors 60 and 62 connected between the potential $+V_B$ and the word straps in memory 10 cause the potential of the distributed capacitances in memory 10 to be clamped to $+V_B$ volts. Resistor 60 is connected to the right ends of straps 12 and 14 and resistor 62 is connected to the right ends of straps 16 and 18. This clamping prevents the leakage discharge of the distributed capacitances.

The invention is not to be limited to the specific embodiment shown and described but is to be limited only by the following claims.

I claim:

1. In a memory stack including (1) plated wires, and (2) inductive word straps, (each strap having a distributed capacitance associated therewith), and (3) means for selectively applying a current to the straps, (including selection diodes), an improved circuit for reverse-biasing the selection diodes by charging the distributed capacitances, comprising:

a. a source of electrical energy at a first potential;

b. switching means;

c. means for connecting the switching means between the source and the distributed capacitance of each word strap;

d. means for applying a signal to the switching means, the signal driving the switching means on, which causes the distributed capacitance of each strap to start charging toward the first potential;

e. biasing means, connected to the source, for providing a second potential lower than the first;

f. means for turning off the switching means by shunting the switching means drive signal to the biasing means when the charge on the distributed capacitances substantially reaches the second potential; and, g. means for clamping the charge distributed capacitances substantially at the second potential.

2. The circuit of claim 1 wherein the switching means is a junction transistor, the collector-emitter circuit thereof in series with the source and the distributed capacitance, and the transistor is caused to become conductive by the application of a signal to the base thereof.

3. The circuit of claim 2 wherein the biasing means comprises a zener diode in series with a filter network, the diode and network connected across the source, the filter network comprising a resistor and capacitor is parallel.

4. The circuit of claim 3 wherein the means for turning off the switching means includes a diode connected between the base and the junction between the zener diode and the filter network.

5. The circuit of claim 4 wherein the means for clamping the charged distributed capacitances includes a resistor connected between the word straps and the junction between the zener diode and the filter network.

* * * * *